July 22, 1947.    H. M. HUGE    2,424,237
FREQUENCY MULTIPLIER
Filed July 3, 1944

INVENTOR.
HENRY M. HUGE
BY Woodling and Krost
ATTORNEYS.

Patented July 22, 1947

2,424,237

UNITED STATES PATENT OFFICE 2,424,237

FREQUENCY MULTIPLIER

Henry M. Huge, Lorain, Ohio, assignor, by mesne assignments, to Lorain Products Corporation, Lorain, Ohio, a corporation of Ohio Application July 3, 1944, Serial No. 543,399

11 Claims. (Cl. 172—281)

This invention pertains to magnetic frequency multipliers and in particular to a frequency multiplying system of increased efficiency capable of supplying either single phase or polyphase output.

It is an object of this invention to provide a magnetic frequency multiplier of increased efficiency.

Another object of this invention is to multiply the frequency of a polyphase source by means of star-connected saturable inductances and to supply the output voltage from the star mid-point of the inductances.

A further object of this invention is to utilize a plurality of groups of star-connected inductances energized from polyphase sources displaced in phase from each other to supply a polyphase output of increased frequency from the star mid-points of the groups of inductances.

Still another object of this invention is to provide stabilized excitation of the output frequency by means of a parallel combination of capacitors and saturable inductances.

Other objects and a fuller understanding of my invention may be obtained by referring to the following specification and claims in connection with the accompanying drawings.

Figure 1:
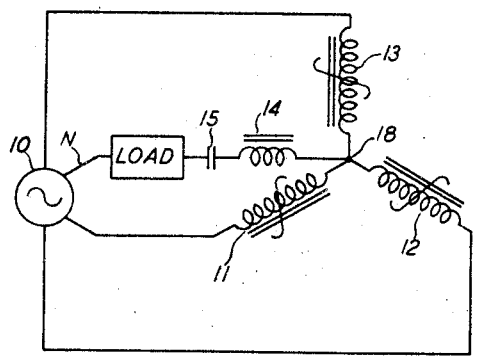

Figure 1 shows a star-connected group of three saturable inductances energized from a three-phase source of alternating current having a neutral wire and adapted to supply a load with voltage of three times the source frequency appearing between the source neutral and the star mid-point of the saturable inductances.

Figure 2:
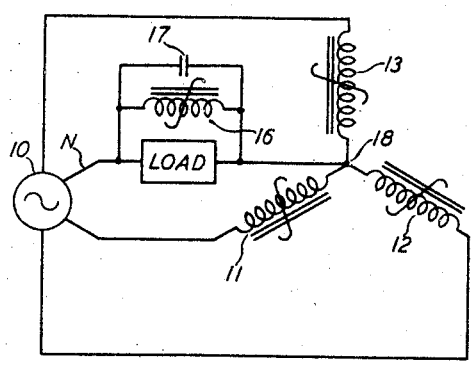
Figure 3:
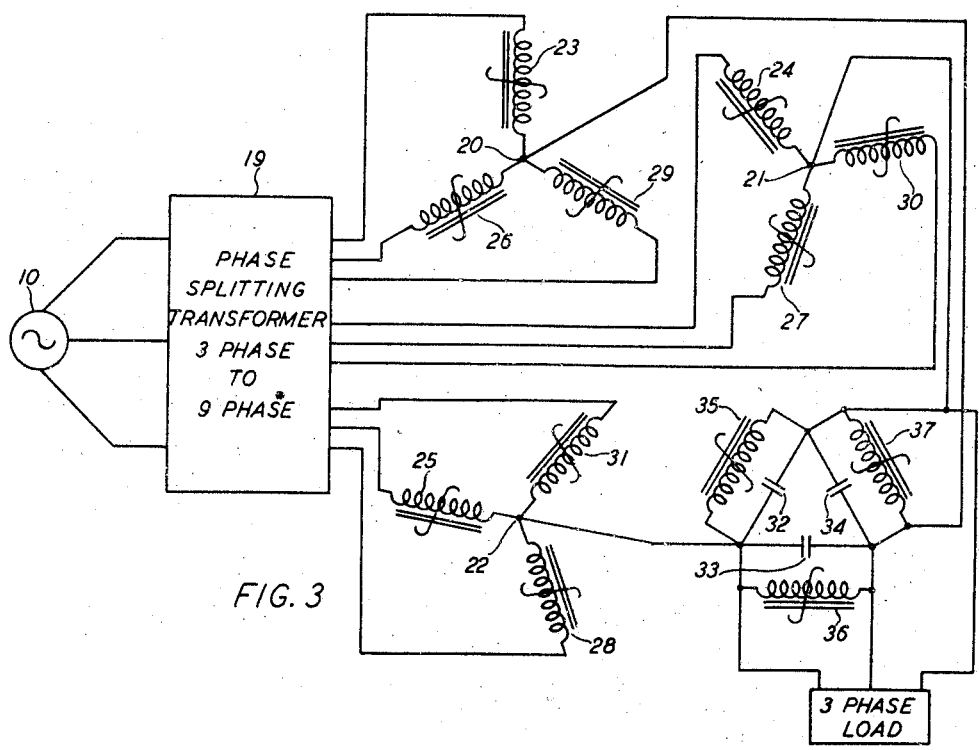

Figure 2 is a modification of the arrangement of Figure 1 utilizing a parallel combination of a capacitor and a saturable inductance for stabilizing the output voltage, and Figure 3 is a schematic diagram of an embodiment of my invention comprising three groups of star-connected saturable inductances having a stabilizing output network connected to their star mid-points for supplying stabilized three-phase output.

With more particular reference to Figure 1, there is shown a group of three star-connected saturable inductances 11, 12 and 13 energized from a three-phase source of alternating current 10 having a neutral connection N. The three saturable inductances 11, 12 and 13 are preferably made substantially alike so that the potential of the star mid-point 18 at the frequency of the energizing source is substantially the same as the potential of the source neutral. The saturation of the three inductances, however, causes harmonic voltages to be generated in them. In particular, the third harmonic is readily generated, and because the third harmonic voltages generated in the three inductances are substantially in phase with each other, a third harmonic voltage appears between the star mid-point 18 and the neutral N of the energizing source. This voltage is supplied to the load through capacitor 15 and inductance 14. Inductance 14 is preferably constructed to have a substantially linear excitation characteristic. Capacitor 15 helps to excite the output voltage, and inductance 14 in series with capacitor 15 tends to suppress the flow of harmonics of the output frequency and thereby stabilizes the operation of the converter and reduces the harmonic content of the voltage supplied to the load. Inductance 14 also increases the voltage across capacitor 15, thereby reducing the capacity required for optimum excitation. Although the output inductance 14 produces several advantages, it is not essential to the operation of the frequency converter and it may be omitted if the size of the capacitor 15 is increased correspondingly.

The circuit arrangement of Figure 1 is capable of highly efficient operation for the generation of the third harmonic of the input frequency. The increased efficiency is obtained because of the fact that the harmonic currents are supplied directly from the exciting windings of the saturable inductances, eliminating the need for secondary windings which would require additional winding space and increase the size and the losses of the saturable inductances.

The circuit of Figure 2 is a modification of the arrangement shown in Figure 1, and shows the load connected directly to the source neutral N and to the star mid-point 18. The excitation of the increased frequency is provided by the capacitor 17 connected in parallel with the load. Stabilization of the output voltage is accomplished by the saturable inductance 16 connected in parallel with capacitor 17. When the load voltage tends to rise above its normal value, inductance 16 saturates and passes greatly increased inductive current to partially nullify the exciting current passed by capacitor 17 and therefore tends to reduce the load voltage to its normal value. A reduction of load voltage below its normal value causes a large decrease in the inductive current passed by inductance 14 and tends to increase the effectiveness of the exciting capacitor 17. Where wide variations of loads are not experienced or where a stabilized output voltage is not required, the saturable inductance 16 may be omitted.

In some cases it may be desirable to provide the saturable inductance 16 with additional windings or with taps on its winding to utilize it as a transformer. It might then be used to step up the voltage supplied to the capacitor or to change the load voltage to any required value or to insulate the load from the source.

Figure 3 shows how three of the star-connected groups of inductances shown in Figures 1 and 2 may be combined to supply three-phase output of three times the energizing frequency. The polyphase input voltage from source 10 is supplied to the phase-splitting transformer 19 which provides three substantially symmetrical three-phase systems displaced in phase from each other. The phase displacement between systems is substantially forty degrees so that the complete output of the phase-splitting transformer 19 comprises a nine-phase system. Each three-phase system is connected to a group of star-connected saturable inductances. Thus, the star-connected inductances 23, 26 and 29 are energized from a substantially symmetrical three-phase source. Saturable inductances 24, 27 and 30 are energized from another symmetrical three-phase source, and the saturable inductances 25, 28 and 31 are energized from another symmetrical three-phase source. The relative phasing of the supply voltages is indicated in Figure 3 by the positioning of the windings 23 to 31. The star mid-points 20, 21 and 22 of the three groups of saturable inductances are connected to an output network comprising the delta-connected capacitors 32, 33 and 34 in parallel with the saturable stabilizing inductances 35, 36 and 37. The load is supplied with a substantially balanced three-phase voltage of three times the source frequency from the output network.

The saturable inductances 23 to 31 are preferably made substantially alike in order to cancel the voltage of the energizing frequency out of the output network. As in Figures 1 and 2, the potentials of the star mid-points are elevated with respect to the source neutral at the third harmonic frequency. However, the groups of inductances in Figure 3 are displaced in phase from each other. The three-phase input voltages supplied to the groups of saturable inductances are displaced 40 degrees from each other; that is, saturable inductance 24 is energized 40 degrees out of phase with saturable inductance 23, saturable inductance 25 is energized 40 degrees out of phase with saturable inductance 24, and so on. The 40 degree displacement of the fundamental voltages produces a 120 degree displacement of the third harmonic voltages, which provides the phase displacement necessary for supplying a balanced three-phase output.

The delta-connected capacitors 32, 33 and 34 connected across the three-phase output serve to aid in exciting the output voltage, while the saturable inductances 35, 36 and 37 connnected in parallel with them serve to stabilize the output voltage in much the same way that the saturable inductance 16 in Figure 2 acts. The delta connection of the output network aids in providing a sinusoidal output voltage, since it substantially eliminates any third harmonic distortion in the voltage wave. The distortion of higher orders is ordinarily present in smaller quantities and it is further attenuated by the low impedance of the capacitors at the higher frequencies.

It will be noted that the circuit of Figure 3 does not require the use of the source neutral since the three star mid-points 20, 21 and 22 comprise the output terminals of the three-phase system. The advantages described in connection with Figure 1 are obtained to the fullest extent with the arrangement of Figure 3. By obtaining the output voltage directly from the exciting windings of the saturable inductances, considerable economy in construction is realized, and at the same time, the reduced size of the saturable units brings about reduced losses and higher efficiency than is otherwise obtainable. A further reduction in losses may be brought about by combining the saturable inductances on common core structures. One type of core construction which may be utilized is shown in my co-pending patent application Serial No. 535,479, filed May 13, 1944. Other types of common-core assemblies may also be used, provided that the core configuration does not suppress the desired harmonic.

The phase-splitting transformer 19 is not described in detail since the methods of adding together voltages displaced in phase from each other in order to increase the number of phases are well known in the art. The input voltage may be obtained from the commercial three-phase line or from any other available polyphase source.

In all the forms of my invention the return path for the load current of the harmonic frequency includes the magnetizing windings of the saturable inductances. In this manner these windings are utilized to their fullest advantage, serving both as energizing windings and as output windings in the load circuit. In Figures 1 and 2 the load circuit is rendered complete through the source neutral and in Figure 3 each of the load circuits is rendered complete through the other phases.

This description has been limited to a method for producing the third harmonic of the input frequency, but it will be apparent to those skilled in the art that circuit modifications may be utilized to provide other harmonics of the input frequency or other numbers of phases. For example, the generation of the fifth harmonic requires five saturable inductances, star-connected and energized from a five-phase source of alternating current. The fifth harmonic output is supplied from the star mid-point and the source neutral as in the arrangements shown in Figures 1 and 2.

Although I have described my invention with a certain degree of particularity, it is to be understood that the present disclosure has been made only by way of example, and that numerous changes in the details of construction and the combination and arrangement of parts may be resorted to without departing from the spirit and scope of the invention as hereinafter claimed.

I claim as my invention:

1. A magnetic frequency multiplier adapted to be energized by a source of polyphase alternating current having a neutral, and adapted to supply a load with a frequency which is a harmonic of the source frequency, comprising, in combination, a plurality of star-connected saturable inductances energized from the polyphase source and a load circuit supplied with voltage developed between the star mid-point of the inductances and the neutral of the polyphase source.

2. A magnetic frequency multiplier adapted to be energized by a polyphase source of alternating current having a neutral connection and adapted to supply a load with voltage of a frequency which is a harmonic of the source frequency, said multiplier comprising a plurality of saturable inductances star-connected and adapted to be energized from said source, and an output circuit connected between the source neutral and the star mid-point of the saturable inductances and adapted to supply the load in series with a capacitor.

3. A frequency tripler adapted to be energized from a three-phase alternating current source having a neutral connection, said frequency tripler comprising three substantially equal saturable inductances star-connected to the source, a load circuit connected between the source neutral and the star mid-point of the saturable inductances, said load circuit having a serially connected capacitor therein and a substantially linear inductance in series with said capacitor.

4. A frequency tripler adapted to be energized from a three-phase alternating current source having a neutral connection, said frequency tripler comprising three substantially equal saturable inductances star-connected to the source, a load circuit connected between the source neutral and the star mid-point of the saturable inductances and an exciting capacitor connected between the source neutral and said star mid-point.

5. A frequency multiplier adapted to be energized by a polyphase alternating current source having a neutral connection, said frequency multiplier comprising a plurality of star-connected saturable inductances adapted to be energized from the source, a load circuit connected between the source neutral and the star mid-point of the saturable inductances, and a stabilizing exciting circuit connected between the source neutral and the star mid-point of the saturable inductances, said stabilizing exciting circuit comprising a capacitor and a saturable stabilizing inductance connected in parallel with each other.

6. A frequency multiplier comprising a plurality of substantially equal groups of star-connected saturable inductances, each group being adapted to be energized by a substantially symmetrical polyphase source of alternating current, the different groups being adapted for energization from displaced phases to generate harmonic voltages in displaced phases, and a polyphase output circuit including a plurality of capacitors, said output circuit being connected to the star mid-points of said groups of saturable inductances.

7. A frequency multiplier comprising three substantially equal groups of star-connected saturable inductances with three substantially equal inductances in each group, each group being adapted to be energized by a substantially symmetrical three-phase source of alternating current, the different groups being adapted for energization from displaced phases to generate harmonic voltages displaced substantially 120 degrees from each other, and a three-phase output circuit including a plurality of capacitors, said output circuit being connected to the three star mid-points of the three groups of saturable inductances.

8. A frequency multiplier comprising three substantially equal groups of star-connected saturable inductances with three substantially equal inductances in each group, each group being adapted to be energized by a substantially symmetrical three-phase source of alternating current, the different groups being adapted for energization from displaced phases to generate harmonic voltages displaced substantially 120 degrees from each other, and a three-phase output circuit including a plurality of capacitors in parallel with a plurality of saturable stabilizing inductances, said output circuit being connected to the three star midpoints of the three groups of saturable inductances.

9. A frequency multiplier comprising phase-splitting means adapted to be energized by a polyphase alternating current source and to provide polyphase output voltages comprising three substantially symmetrical three-phase systems having substantially 40 degrees phase displacement between them, three groups of saturable inductances with three star-connected inductances in each group, each group being connected to one of the substantially symmetrical three-phase systems, and a three-phase output circuit connected to the star mid-points of the groups of saturable inductances, said output circuit including three delta-connected capacitors in parallel with three saturable stabilizing inductances.

10. A frequency multiplier comprising phase-splitting means adapted to be energized by a polyphase alternating current source and to provide output voltages comprising a plurality of substantially symmetrical polyphase systems displaced in phase from each other, a plurality of groups of saturable inductances, each group comprising a plurality of inductances star-connected to one of the substantially symmetrical polyphase systems, and a polyphase output circuit connected to the star mid-points of the groups of saturable inductances, said output circuit including a plurality of capacitors adapted to aid in the excitation of polyphase voltage of a frequency which is a harmonic of the source frequency.

11. A magnetic frequency multiplier comprising a plurality of star-connected saturable inductances adapted to be energized from a polyphase source of alternating current, a load circuit connected to the star midpoint of the saturable inductances and including said inductances in its return circuit, and a capacitor connected in said load circuit and adapted to aid in the excitation of a harmonic frequency in said saturable inductances.

HENRY M. HUGE.

REFERENCES CITED

The following references are of record in the file of this patent:

UNITED STATES PATENTS

| Number | Name | Date |
|---|---|---|
| 1,372,202 | Shoenberg | Mar. 22, 1921 |
| 1,372,203 | Shoenberg | Mar. 22, 1921 |